United States Patent
Daumer et al.

(10) Patent No.: US 12,500,978 B2
(45) Date of Patent: Dec. 16, 2025

(54) METHOD AND SYSTEM FOR DETERMINING A MOBILE NETWORK OPERATOR IDENTIFIER

(71) Applicant: EXFO Solutions SAS, Saint-Jacques-de-la-Lande (FR)

(72) Inventors: Christopher Daumer, Rennes (FR); Thomas Bourhis, Rennes (FR); Christophe Gay, Rennes (FR)

(73) Assignee: TC France S.A.S, Saint-Jacques-de-la-Lande (FR)

( * ) Notice: Subject to any disclaimer, the term of this patent is extended or adjusted under 35 U.S.C. 154(b) by 345 days.

(21) Appl. No.: 18/101,425

(22) Filed: Jan. 25, 2023

(65) Prior Publication Data

US 2023/0275992 A1   Aug. 31, 2023

Related U.S. Application Data

(60) Provisional application No. 63/314,684, filed on Feb. 28, 2022.

(51) Int. Cl.
*H04M 3/00* (2024.01)
*H04M 3/42* (2006.01)

(52) U.S. Cl.
CPC ............... *H04M 3/42297* (2013.01)

(58) Field of Classification Search
CPC ................................. H04M 3/42297
See application file for complete search history.

(56) References Cited

U.S. PATENT DOCUMENTS 6,633,764 B1   10/2003   Garcia
6,731,730 B1 *  5/2004   Zolotov ............... H04M 15/59
                                                379/126

(Continued)

FOREIGN PATENT DOCUMENTS

EP       0708570 A2    4/1996
WO    2009015273 A2    1/2009

OTHER PUBLICATIONS

GSMA, ENUM Guidelines for Service Providers and IPX Providers Version 1.1, May 28, 2018.

(Continued)

*Primary Examiner* — Khai M Nguyen
(74) *Attorney, Agent, or Firm* — Baratta Law PLLC; Lawrence A. Baratta, Jr.; Ryan Odessa

(57) ABSTRACT

The invention concerns a method and system for determining a mobile network operator identifier in relation to a mobile device subscriber number and a telecommunications network event, the telecommunications network event comprising a call set-up initiated by a first mobile device having an associated first mobile device subscriber number to connect to a second mobile device having a second mobile device subscriber number, the call set-up comprising sending a request to a portability server, the portability server sending a response formatted according to a predetermined format depending on a type of cellular technology. The determination comprises analyzing the response and extracting an identifier of the mobile network operator associated to the second mobile device subscriber number, and storing, in a dedicated storing structure, an association between the mobile network operator identifier and the second mobile device subscriber number of the second mobile device.

20 Claims, 8 Drawing Sheets

(56) References Cited

U.S. PATENT DOCUMENTS

| | | |
|---|---|---|
| 6,832,089 B2 | 12/2004 | Jean Henry-Labordere |
| 8,238,905 B2 | 8/2012 | Jiang |
| 8,509,068 B2 | 8/2013 | Begall et al. |
| 8,516,115 B2 | 8/2013 | Westman |
| 9,712,341 B2 | 7/2017 | Nas |
| 9,794,769 B2 | 10/2017 | Dubesset et al. |
| 2004/0133685 A1 | 7/2004 | Jaaskela et al. |
| 2005/0111640 A1* | 5/2005 | Moisey .............. H04Q 3/005 379/126 |
| 2005/0226399 A1 | 10/2005 | Moisan et al. |
| 2008/0293408 A1 | 11/2008 | Jiang |
| 2011/0158395 A1* | 6/2011 | Farel .............. H04M 15/00 379/112.01 |
| 2014/0323080 A1 | 10/2014 | Mishkin et al. |
| 2018/0139565 A1* | 5/2018 | Norris .............. H04S 7/304 |
| 2022/0360663 A1* | 11/2022 | Kempson .......... H04M 3/42306 |

OTHER PUBLICATIONS

Lin et al., Mobile Number Portability, Dec. 31, 2003.
GSM Association, "ENUM Guidelines for Service Providers and IPX Providers," Version 2.0, Oct. 19, 2020, pp. 1-59.

* cited by examiner

∨ Anwers
∨ 2.0.3.2.4.2.4.4.1.5.1.e164.arpa: type NAPTR, class IN, order 10, preference 100, flags u ← 65
    Name: 2.0.3.2.4.2.4.4.1.5.1.e164.arpa
    Type: NAPTR (Naming Authority Pointer) (35)
    Class: IN (0x0001)
    Time to live: 0 (0 seconds)
    Data lenght: 97
    Order: 10
    Preference: 100
    Flags Lenght: 1
    Flags: u
    Service lenght: 12
    Service: E2U+pstn.sip
    Regex: !^.*$!sip:+1-514-424-2302;npdi@ims.mnc500.mcc302.3gppnetwork.org;user=phone!  ← 67
    [Replacement Lenght: 6]
    Replacement: <Root>

FIG.6

METHOD AND SYSTEM FOR DETERMINING A MOBILE NETWORK OPERATOR IDENTIFIER

FIELD OF THE INVENTION

The present invention concerns a method and system for determining a mobile network operator identifier in relation to a mobile device subscriber number. The invention is in the field of monitoring the operations in a telecommunications network.

BACKGROUND OF THE INVENTION

One of the aspects of monitoring of a telecommunications network is to be able to provide an information regarding the mobile network operator, also designated by PLMN (public land mobile network) in association with a mobile device subscriber number, also called MSISDN (for Mobile Station International Subscriber Directory Number), and commonly known as the subscriber's phone number.

In a known manner, a public land mobile network is a combination of cellular technologies offered by a specific operator in a specific country, and may consist of one or several cellular technologies such as GSM/2G, UMTS/3G, LTE/4G and further 5G, all defined by various standards for telecommunications.

One functionality offered in telecommunications is the portability, which designates the possibility to keep the same mobile device subscriber number while the geographic area/operator change. The mobile device subscriber number is then said to be ported by a second mobile network operator, different from the first (initial) mobile network operator. Given the portability functionality, it is no longer possible to easily identify the mobile network operator from the phone number itself.

There is a need to identify the mobile network operator for various monitoring operations, such as troubleshooting, statistics, and also for billing the communications to the various operators.

A potential solution for identifying the mobile network operator would be to use the IMSI (for International Mobile Subscriber Identity), which in stored in the SIM (Subscriber Identification Module) or USIM (Universal Subscriber Identity Module), since the IMSI is a number formed of 15 digits, comprising 5 to 6 digits indicating the PLMN.

However, when monitoring the telecommunications network for a given mobile network operator, the IMSI is only provided for subscribers of the monitored mobile network operator.

There is a need to remedy to the drawbacks of the prior art, so as to be able to determine the mobile network operator even if the ported mobile device subscriber number is ported by a mobile network operator different from the monitored mobile network operator.

BRIEF SUMMARY OF THE INVENTION

This and other objects are achieved by a method for determining a mobile network operator identifier in relation to a mobile device subscriber number, and to a telecommunications network event, the telecommunications network event comprising a call set-up initiated by a first mobile device having an associated first mobile device subscriber number to connect to a second mobile device having a second mobile device subscriber number, the call set-up comprising sending a request to a portability server, the portability server sending a response formatted according to a predetermined format depending on a type of cellular technology, the method being implemented by at least one processor of a programmable device and comprising:

analyzing said response and extracting an identifier of the mobile network operator associated to the second mobile device subscriber number, storing, in a dedicated storing structure, an association between the mobile network operator identifier and the second mobile device subscriber number of the second mobile device.

Advantageously, the method proposed is based on passively analyzing control data used for setting-up calls.

Advantageously, the method proposed is adapted to all types of cellular technologies, and provides an association between the mobile network operator identified and the mobile device subscriber number, in relation to a telecommunications network event such as a call set-up.

In embodiments of the invention, the method for determining a mobile network operator identifier according to the invention comprises one or more of the following features, considered alone or according to all technically possible combinations.

The dedicated storing structure is a table or a database.

The method further comprises displaying on a user interface, an informative relative to said association for at least one telecommunications network event during a given period of time.

The analyzing is followed by extracting a code comprising a Mobile Country Code, MCC, and a Mobile Network Code, MNC, said code being the mobile network operator identifier.

The method further comprises obtaining a mobile network operator name associated to said code from a database, said operator name being the mobile network operator identifier.

The method further comprises, after the extracting said code, determining whether the second mobile device subscriber number is ported or not ported.

When the cellular technology is 2G or 3G, the portability server is a Mobile Number Portability, MNP, server sending a response formatted according to CoreCS MAP protocol, and the analyzing step comprises parsing the response from the MNP server to retrieve a portability status of the second mobile device subscriber number, and extracting a first part of a predetermined field of the response, said first part containing five digits representative of the mobile country code and the mobile network code of the operator of the second mobile device.

The cellular technology is 4G or 5G, the portability server is a Domain Name Server Electronic Numbering server sending a response formatted according to VoIP protocol, and the method comprises parsing a SIP URI scheme to obtain code digits corresponding to the Mobile Country Code, MCC, and the Mobile Network Code, MNC. According to another aspect, the invention concerns a system for determining a mobile network operator identifier in relation to a mobile device subscriber number, and to a telecommunications network event, the telecommunications network event comprising a call set-up initiated by a first mobile device having an associated first mobile device subscriber number to connect to a second mobile device having a second mobile device subscriber number, the call set-up comprising sending a request to a portability server, the portability server sending a response formatted according to a predetermined format depending on a type of cellular technology, the system comprising at least one processor configured to implement:

analyzing said response and extracting an identifier of the mobile network operator associated to the second mobile device subscriber number, storing, in a dedicated storing structure, an association between the mobile network operator identifier and the second mobile device subscriber number of the second mobile device.

According to another aspect, the invention concerns a computer program product comprising software instructions, which, when implemented by a programmable device, implement a method for determining a mobile network operator identifier as briefly described above.

BRIEF DESCRIPTION OF THE DRAWINGS

Further characteristics and advantages of the present invention will become apparent from the following description, provided merely by way of non-limiting example, with reference to the enclosed drawings, in which:

FIG. 6 is a second example of formatted response;

DETAILED DESCRIPTION OF EMBODIMENTS

The invention will be described hereafter according to two different embodiments, a first embodiment particularly useful for GSM/2G, UMTS/3G cellular technologies, and a second embodiment particularly useful for LTE/4G and 5G cellular technologies.

Figure 1:
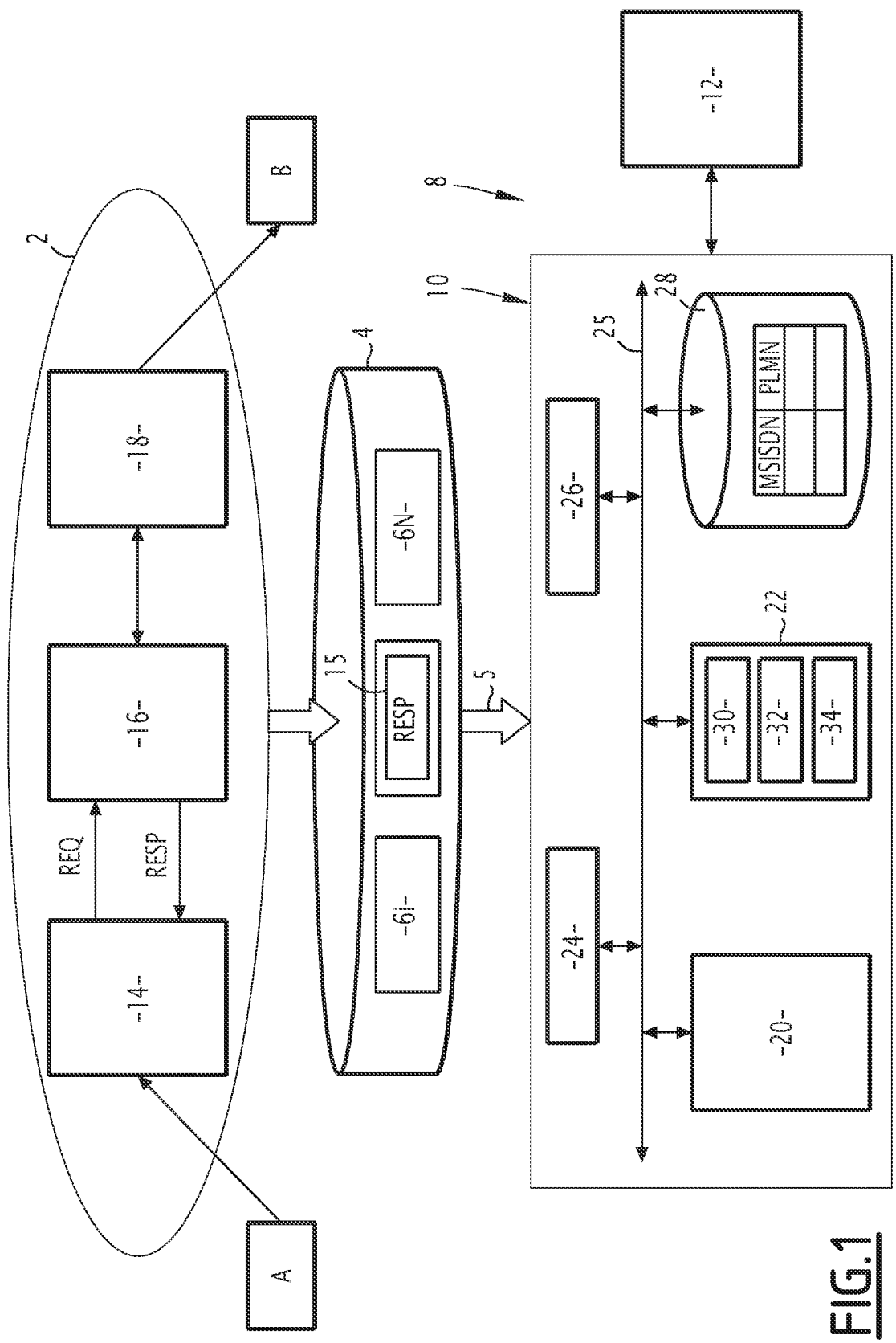
FIG. 1 illustrates schematically a telecommunications network system and a system for determining a mobile network operator identifier according to an embodiment.

FIG. 1 illustrates schematically a telecommunications network 2. The architecture of the telecommunications network 2 is not detailed here, since the invention applies to any type of network architecture, e.g. GSM/2G, UMTS/3G, LTE/4G and 5G.

Such a telecommunications network 2 is typically a system including network elements or nodes such as switches, routers, terminals, repeaters, aggregation devices, and more generally any network devices responsible for some aspect of data processing, switching, transmission. The network devices are adapted to implement a telecommunications technology, for example a radio communication technology such as GERAN, UTRAN, eUTRAN etc.

The invention is adapted for all cellular technologies, i.e. 2G, 3G, 4G, 5G.

The user mobile devices, i.e. mobile telephone devices A, B, also called user equipment, are adapted to connect to the network for communication services, such as voice or data communication.

The telecommunications network 2 also comprises equipment or probes which generate data 4, which is control data, representative of the operation of the network.

The control data 4 is obtained, without limitation, from a Network Management System (NMS), an Element Management System (EMS), a Software Defined Networking Controller (SDN). The control data 4 representative of the operation of the network 2 is generated over time, for example on successive time units.

In the case of a telephony network, the control data 4 comprises Call Detail Records (CDR) or Session Detail Reports (SDR) 6i . . . 6N, which are successive time data records that store the various attributes of voice call or other telecommunications transactions (e.g. text message, data sessions, signaling or the like). The term CDR is used hereafter for these types of detailed reports.

The CDRs contain various attributes of telecommunications network events, such as for example call/session/signaling procedure, call set-up procedure, time, duration, completion status, source mobile number, destination mobile number, handset information, involved services, involved network equipment.

The control data 4 representative of the operation of the network is provided to a system 8 for monitoring the network operation, which is configured to determine a mobile network operator identifier.

The control data 4 is provided to the network operation monitoring system 8 via a communication link 5 through a communication network, for example the Internet, a Wide Area Network (WAN), a Local Area Network (LAN), a Virtual LAN (VLAN).

The network operation monitoring system 8 is dedicated to monitoring passively the operation of the telecommunication network 2.

The network operation monitoring system 8 comprises a system 10 for determining a mobile network operator identifier in relation to a mobile device subscriber number and a telecommunications network event (e.g. a call set-up), and a user device 12 for the display of a graphical user interface (GUI) that includes a timeline visualization of the operation of telecommunications network 2. The user device 12 is configured for displaying graphical representations such as graphs, tables, curves indicating the mobile network operators associated to a mobile device subscriber numbers.

More particularly, according to embodiments of the invention, the mobile network operator identifier is a mobile operator name, which will be designated by PLMN (for Public Land Mobile Network). For example, a PLMN code MCC-MNC is used as a mobile network identifier. In other words, the PLMN identifier is the concatenation MCC-MNC.

The subscriber device number, commonly known as the subscriber's phone number, will be designated by MSISDN (for Mobile Station International Subscriber Directory Number).

The system 10 is configured to determine the PLMN for each MSISDN by applying an analysis of the control data 4, in a passive manner, i.e. without applying any further request to the telecommunications network 2.

To this end, the determining uses control data 4 stored for a telecommunications network event comprising a call set-up initiated by a first mobile device A, having an associated first subscriber device number MSISDN-A, to reach a second mobile device B, having an associated second subscriber device number MSISDN-B.

As schematically shown in FIG. 1, the call set-up comprises sending, by a network element 14, a request REQ to a portability server 16, the portability server sending a response RESP formatted according to a predetermined format depending on the type of cellular technology, as will be explained in further detail hereafter.

The connection for communication with the second mobile B is achieved via a network element 18, and may in practice involve several intermediate network elements/connections depending on the telecommunications network architecture which is not described in further detail here.

The portability server 16 sends a response RESP formatted according to a predetermined format depending on the type of cellular technology.

The response RESP 15 is stored in one of the data records (CDR) of control data 4, and is used by the system 10 for determining the PLMN associated with the number MSISDN-B, whether the second mobile device B is ported or not ported.

The type of request REQ and response RESP, and the type of portability server 16 depend on the cellular technology as described in more detail hereafter.

The system 10 determining a mobile network operator identifier in relation to a mobile device subscriber number is for example a programmable device or a general purpose computer system, comprising one or more processors 20, and an electronic memory 22.

The system 10 further comprises a network interface 24, configured to receive data, via a communication link 5, from the telecommunications network 2, in particular to receive control data 4 representative of the network operation, an input/output interface 26 and a data store 28. The data store 28 is in particular configured to store a memory structure 35, such as a table or a database, associating each MSISDN to a PLMN.

The memory structure 35 is updated each time a new association between an MSISDN and a PLMN is found. The updating consists, for example, in replacing a previous association by the new association for a given MSISDN.

All elements 20, 22, 24, 26, 28 are coupled via a communication bus 25.

The processor 20 is a hardware device configured to implement software instructions, such as a CPU (Central Processing Unit), a semi-conductor microprocessor (in the form of a microchip or a chipset), or more generally any device for executing software instructions. When the system 10 is in operation, the processor 20 is configured to execute software stored in memory 22.

The data store 28 is for example a recording medium, such as an optical disk, a magneto-optical disk, any type of non-volatile memory (e.g. EPROM, EEPROM, FLASH, NVRAM), a magnetic card or and optical card.

In an alternative embodiment, the data store 28 may be located on an external server (non represented).

The electronic memory 22 may include any of volatile memory elements, such as random access memory RAM, DRAM, SRAM, SDRAM, non-volatile memory elements such as ROM, (e.g. EPROM, EEPROM, FLASH, NVRAM), a magnetic card or and optical card. Memory 22 may have a distributed architecture, where various components are situated remotely from one another, but can be accessed by processor 20.

The processor 20 is configured to execute the following modules, stored in the electronic memory 22 and forming a computer program:
   an analyzing module 30 for analyzing said response RESP and extracting an identifier of the mobile network operator associated to the second mobile device subscriber number, i.e. the called mobile device subscriber number, a storing module 32 for storing, in the dedicated storing structure 35, an association between the identifier of the mobile network operator and the second mobile device subscriber number;

a display module 34 for displaying on the user interface, the association between the identified mobile network operators and the mobile device subscriber numbers for each telecommunications network event during a given period of time, or several periods of time.

In one embodiment, the modules 30, 32 and 34 are implemented as software and form a computer program that implements a method for determining a mobile network operator identifier according to one embodiment of the invention when executed by a processor of a programmable electronic device.

In one variant, not represented, the modules 30, 32 and 34 are each implemented as a programmable logic component, such as an FPGA (Field Programmable Gate Array), a GPU (graphics processor) or a GPGPU (General-purpose processing on graphics processing), or as a dedicated integrated circuit, such as an ASIC (Application Specific Integrated Circuit).

Examples of embodiments of the modules 30, 32, 34 will be given below.

A first embodiment of the invention will be described hereafter with reference to FIGS. 2, 3 and 4.

According to the first embodiment, the invention is applied with 2G and 3G cellular technology, based on the a Core Network Circuit Switching (CoreCS) network architecture and on the Mobile Application Part (MAP) protocol.

Figure 2:
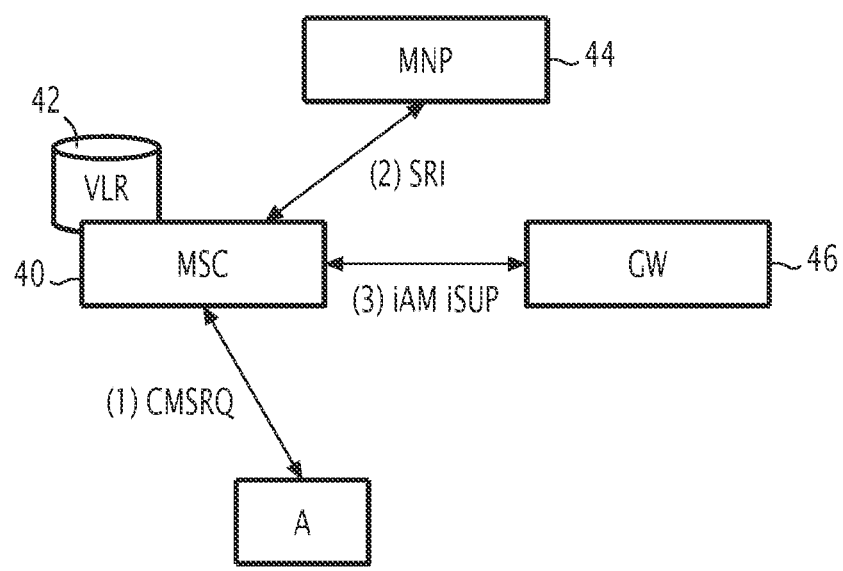
FIG. 2 is a schematic representation of a network architecture according to a first use case.

FIG. 2 illustrates schematically the network architecture and the call flow in the case where the MSISDN-B of the second mobile device B, called by the first mobile device A, is ported out.

In the example illustrated in FIG. 2, during call set-up, the first mobile device A sends (step 1) a call request CMSRQ (for Connection Management service Request) to a Mobile service Switching Center (MSC) 40. The MSC 40 has an associated Visitor Location Register (VLR) 42, which is a database of the mobile devices (also called mobile stations) that have roamed into the jurisdiction of the MSC 40. The VLR 42 is co-localized with MSC 40.

The MSC 40 communicates with a portability server 44, which is an MNP (Mobile Number Portability) server in this case according to the MAP protocol routine SEND ROUTING INFORMATION (MAP SRI).

The routine comprises sending (Step 2) a MAP SRI request to the MNP 44 to obtain information relative to routing, and in particular information relative to the portability status of the called number MSISDN-B.

The MNP 44 comprises a database with all the ported MSISDN and the corresponding PLMN. A MAP SRI response is sent to the MSC 40, comprising information relative to the portability status of MSISDN-B.

The response RESP sent is further stored with the data 4 representative of the operation of the network.

During the call-setup, the MSC 40 further communicates (step 3) with a gateway GW 46 to send an IAM ISUP (for Identity Access Management ISDN User Part) invitation to establish communication, according to a known standardized procedure.

The system 10 for determining a mobile network operator identifier analyzes the response RESP as stored.

Figure 3:
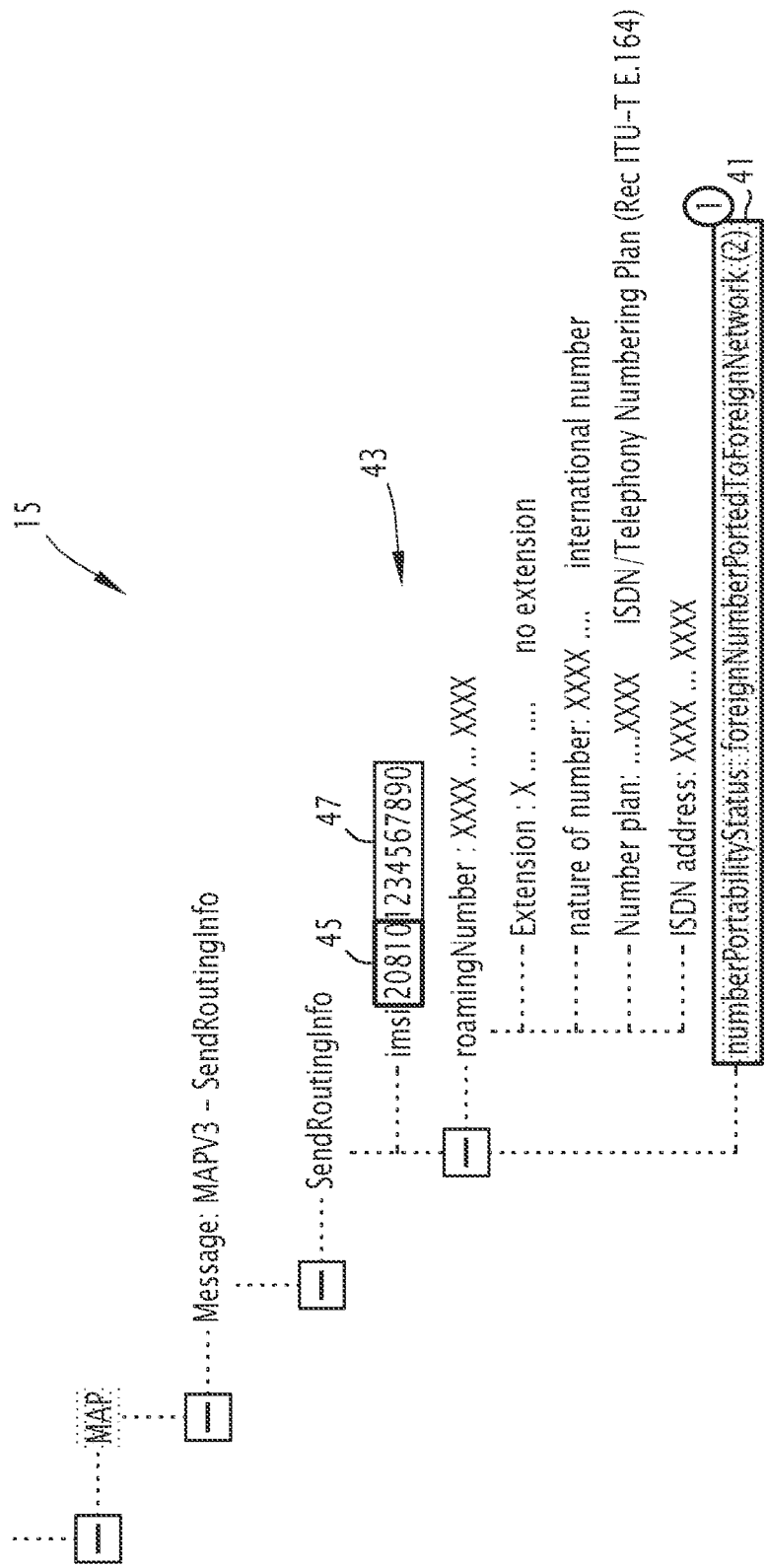
FIG. 3 is a first example of formatted response.

An example of response RESP 15 is shown in FIG. 3, based on 3GPP 29.002.

The response 15 comprises a field 41 called "numberPortabilityStatus" which returns one of the three possible results:
   notKnownToBePorted(1)
   ownPortedOut(2)
   foreignNumberPortedToForeignNetwork(3)

In addition, the response 15 comprises a field "imsi" 43, which comprises 15 digits, and may comprise a "fake" IMSI, i.e. a 15 digits number that is not the actual IMSI of the MSISDN-B.

However, the field "imsi" 43 can be split into two parts, a first part 45 of five digits, and a second part 47 of 10 digits.

The first part 45 of five digits actually comprises an identifier of the PLMN, i.e. the Mobile Country Code (MCC) on three digits and the Mobile Network Code (MNC) on two digits. The MCC is a standardized code used in wireless telephone networks (GSM, CDMA, UMTS, LTE etc) in order to identify the country in which a mobile subscriber belongs to. The combination MCC and MNC uniquely identifies the PLMN.

The second part 47 of the field "imsi" 43 may comprise padding digits, as shown in the example of FIG. 3.

Figure 4:
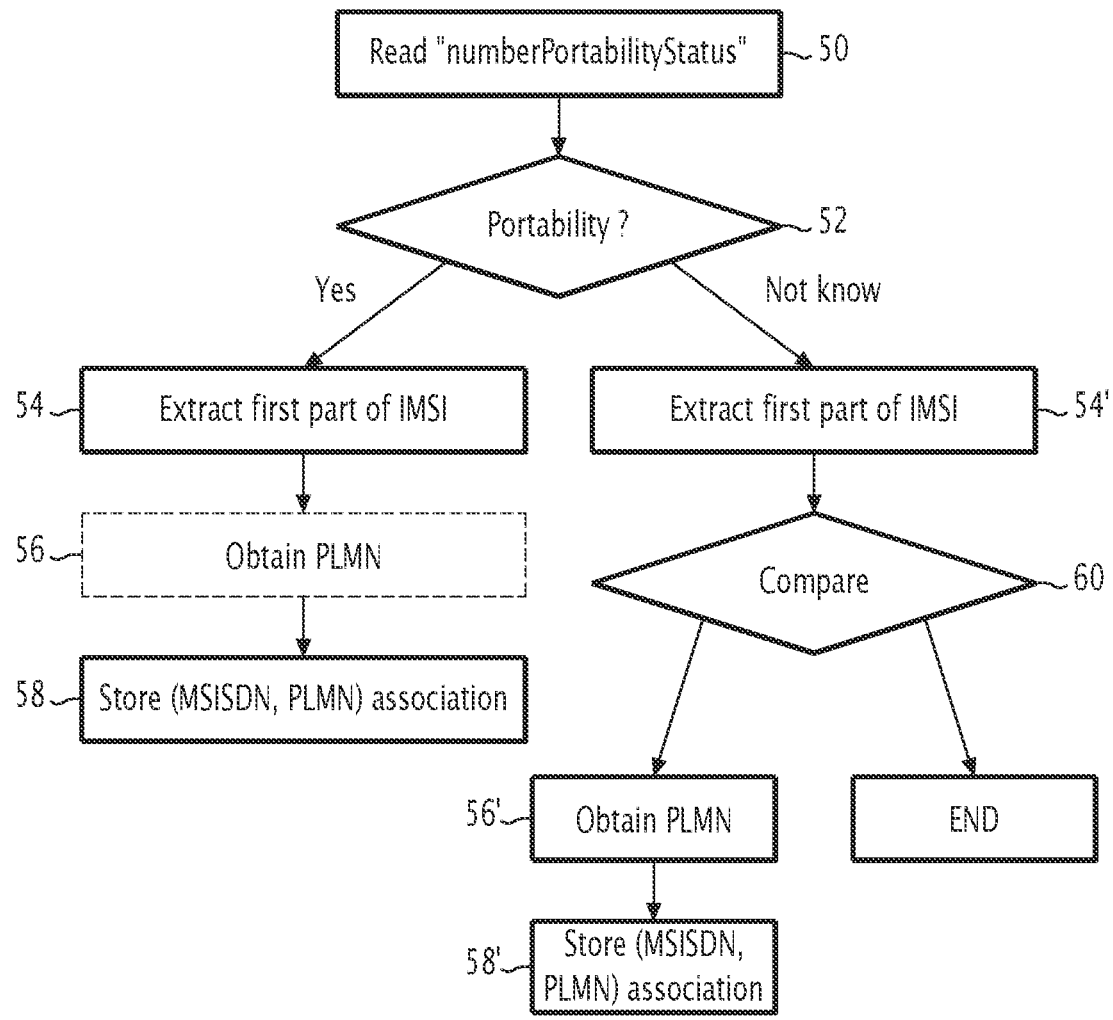
FIG. 4 is a flowchart of the steps of a method for determining a mobile network operator identifier according to a first embodiment.

According to the first embodiment, a method for determining a mobile network operator identifier comprises the following steps, as shown in reference to FIG. 4.

The analyzing module 30 analyzes the response RESP 15 by parsing (step 50) the response 15 to read the content of the filed 41: numberPortabilityStatus.

The return of the numberPortabilityStatus is analyzed (checking step 52), and if a portability is indicated, i.e. if the numberPortabilityStatus is "ownPortedOut(2)" or "foreignNumberPortedToForeignNetwork(3)", the response is further parsed to find the "imsi" field 43, and the first 5 digits of the field 43 are extracted (step 54).

Therefore, an identifier of the PLMN is obtained.

Optionally, the name of the mobile network operator is extracted (step 56) from a public database which maps the MCC-MNC and the operator names. For example, the name of the mobile network operator is further displayed on a user interface to facilitate monitoring.

Then the storing module 32 applies a storing step 58 to store, in a dedicated storing structure, such as a table or a database, an association between the identified mobile network operator, in the form of the MCC-MNC or in the form of the operator name, and the mobile device subscriber number MSISDN-B.

If the return of numberPortabilityStatus is "notKnownToBePorted(1)", the method comprises an extraction (step 54') of the first 5 digits of the "imsi" field 43, which represent the MCC-MNC code in the fake "imsi" field. This extraction step 54' is analogous to step 54.

Then the extracted MCC-MNC code, which is a first five-digit code, is compared (comparison step 60) to the CC (for Country Code)-NDC (for National Destination Code), which is a second five digit code, extracted from the SRI request containing the MSISDN-B. Indeed, the MSISDN-B is formatted as CC-NDC-SN.

If the first code and the second code differ, then the comparison step 60 is followed by steps 56' and 58', which are analogous to steps 56 and 58 previously described. Indeed, in this case, it is considered that the "notKnownToBePorted(1)" is not reliable, but that the first part of the fake "imsi" field is reliable to indicate the MCC-MNC code identifying the PLMN.

If the first five digit code and the second five digit code are identical, the method ends. In this case, it is considered that the MSISDN-B is not ported.

A second embodiment of the invention will be described hereafter with reference to FIGS. 5, 6 and 7.

According to the second embodiment, the invention is applied with 4G and 5G cellular technology, based on the a IP Multimedia Core Network Subsystem (IMS) network architecture and on the Voice Over IP (VOIP) protocol.

Figure 5:
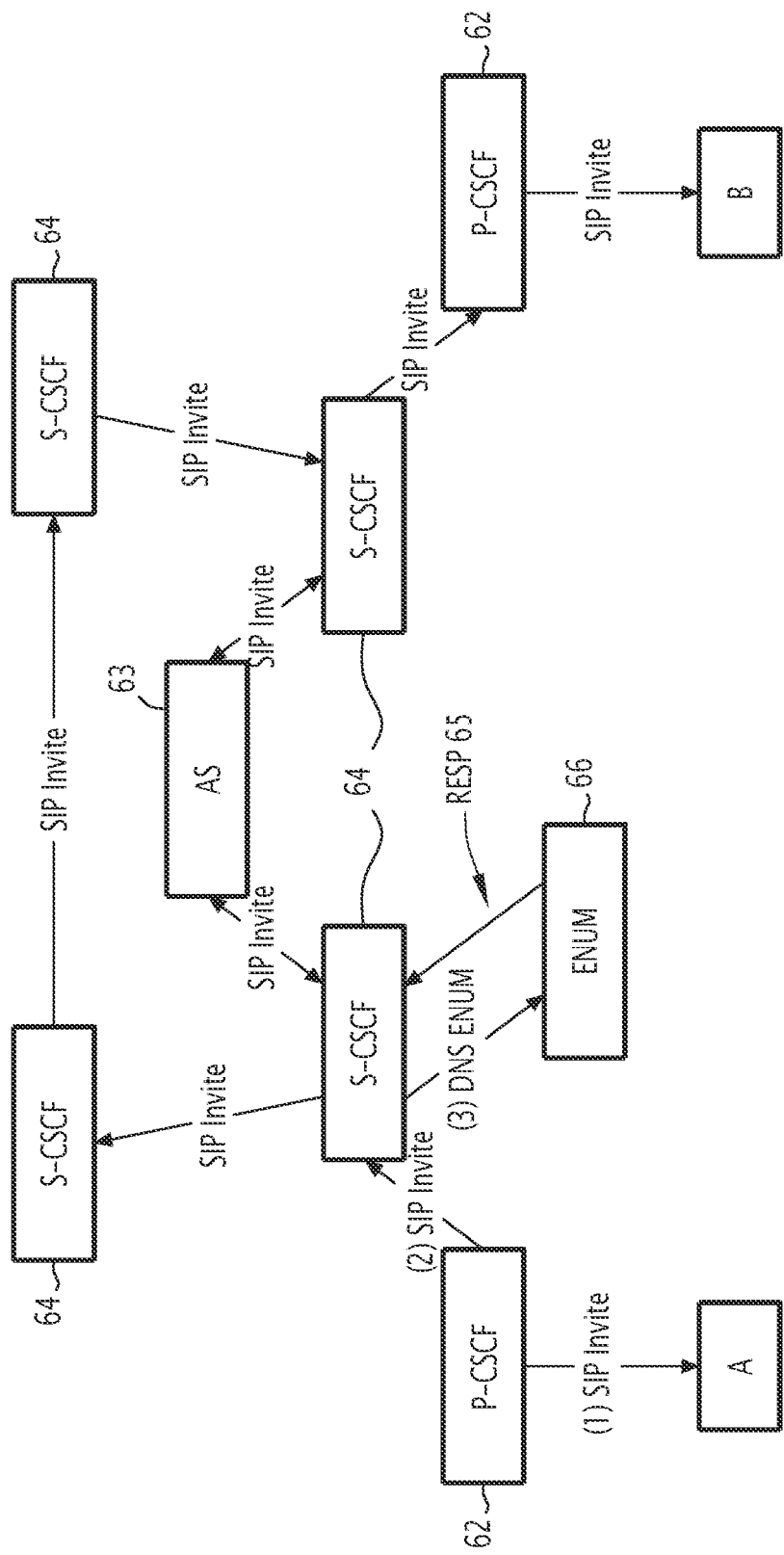
FIG. 5 is a schematic representation of a network architecture according to a second use case.

FIG. 5 illustrates schematically an example of network architecture and of call flow in the case the MSISDN-B of the second mobile device B, called by the first mobile device A, is ported out.

In a known manner, which will not be described in further detail here, the network architecture comprises several Session Initiation Protocol (SIP) proxies 62 or servers 64, respectively P-CSCF and S-CSCF, where CSCF stands for Call SessionControl Function, and an Application Server AS 63.

An S-CSCF 64 comprises a Electronic Numbering ENUM 66 look-up table, which form a portability server in this second embodiment.

In this second embodiment, upon call set-up, the first mobile device A sends (step 1) a SIP invite request to a proxy P-CSCF 62, and the proxy P-CSCF 62 forwards the SIP invite (step 2) to a S-CSCF. The server C-CSCF queries (step 3) the portability server ENUM 66 with the DNS ENUM protocol (for Domain Name Service Electronic Numbering E. 164 Number to URI Mapping) to know if the second mobile device B is an IMS user, i.e. a user registered on the IMS network to make call with VoIP.

The ENUM server 66 answers with a response RESP 65 formatted as a SIP URI (for Uniform Resource Identifier) scheme, as defined by RFC 3261 "SIP: Session Initiation Protocol". Such a SIP URI scheme is a formatted regular expression, an example of which is shown in FIG. 6.

The SIP URI 65 contains various formatted fields, one of the fields containing the regular expression 67 containing MNC and MCC identifier information as shown in the example of FIG. 6.

Figure 7:
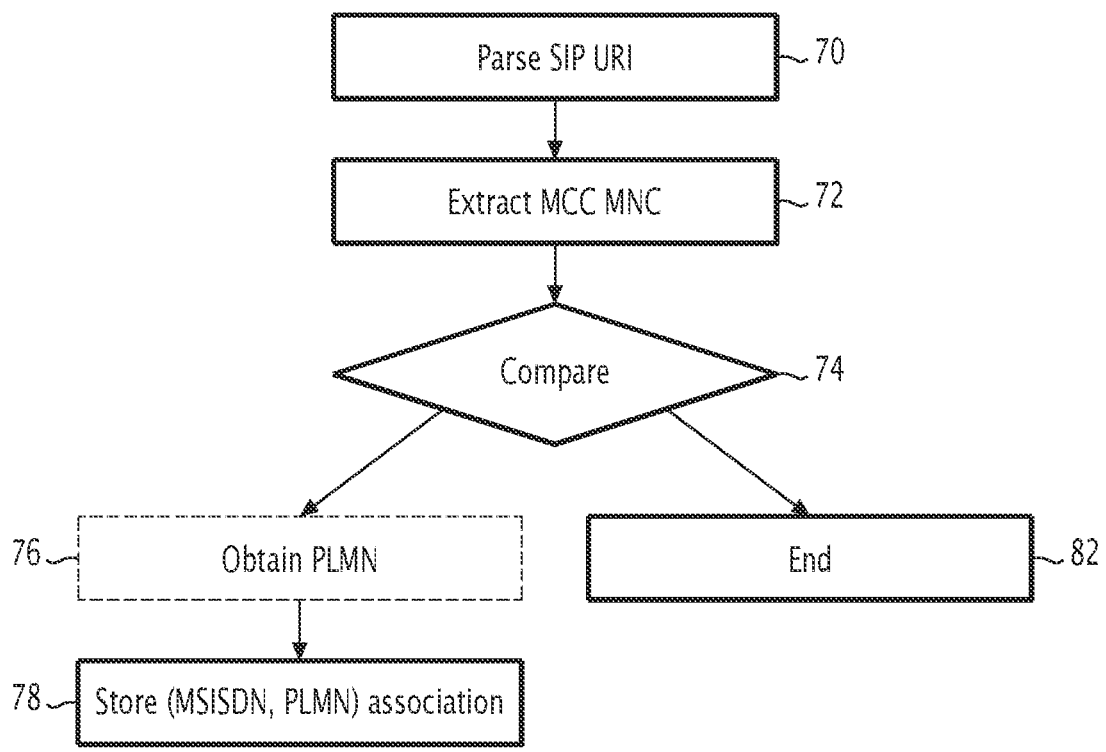
FIG. 7 is a flowchart of the steps of a method for determining a mobile network operator identifier according to a second embodiment.

According to the second embodiment, a method for determining a mobile network operator identifier comprises the following steps, as shown in reference to FIG. 7.

The analyzing module 30 analyzes the response RESP 65 by parsing (step 70) the SIP URI scheme to find the 'mnc' and the 'mcc' strings.

The digits following respectively the 'mnc' and the 'mcc' strings are extracted (step 72) and the code MCC-MNC is obtained.

The method then comprises a comparison step 74, which compares the extracted MCC-MNC, which is a first code, to the CC-NDC, which is a second code, extracted from the SIP invite containing the MSISDN-B.

If the first code and the second code differ, then the comparison step 74 is followed by an optional step 76, analogous to step 56 previously described, of extracting the name of the mobile network operator is extracted from a database which maps the MCC-MNC and the operator names.

The method further comprises a storing step 78, analogous to step 58 previously described, applied by the storing module, for storing, in a dedicated storing structure, such as a table or a database, an association between the identified mobile network operator, in the form of the MCC-MNC or in the form of the operator name, and the mobile device subscriber number MSISDN-B.

If the outcome of the comparison step 74 is that the first code and the second code are identical, the method ends. In this case, it is considered that the MSISDN-B is not ported.

Figure 8:
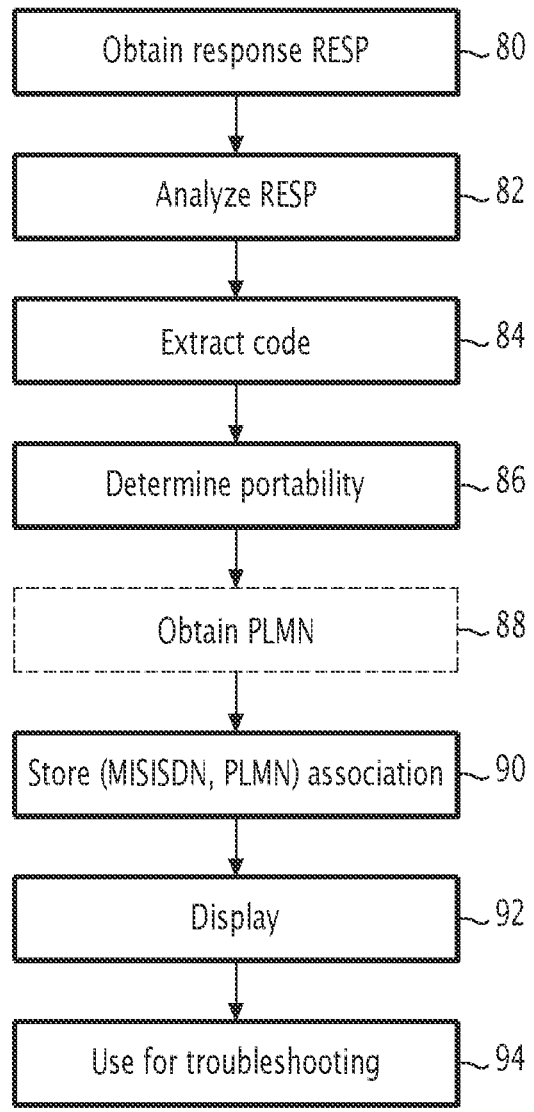
FIG. 8 is a flowchart of the steps of a method for determining a mobile network operator identifier according an embodiment.

As shown in FIG. 8, according to a general description applicable to all embodiments, a method for determining a mobile network operator identifier according to the invention comprises obtaining (step 80) a response formatted according to a predetermined format depending on the type of cellular technology from memorized control data, the control data being memorized during call set-up, the response containing information provided by a portability server.

The response contains information on a call set-up initiated by a first mobile device having an associated first mobile device subscriber number to connect to a second mobile device having a second mobile device subscriber number, and in particular on the portability status of the second mobile device subscriber number.

The method comprises analyzing the response (step 82) by parsing the response looking for one or several predetermined fields, and extracting (step 84) an identifier, e.g. a code relative to the mobile network operator associated to the second mobile device subscriber number. The code comprises typically the MCC-MNC digits representative of the mobile country code and the mobile network code.

The method further comprises a step 86 of determining if the mobile device subscriber number is ported or not, based on a comparison between the code relative to the mobile network operator extracted at step 84 and a code extracted from a request sent during call set-up and containing the second mobile device subscriber number.

The MCC-MNC code can serve as a mobile network identifier.

Optionally, the method may comprise a step of determining 88 the operator name from the MCC-MNC code, the operator name being used as a mobile network operator identifier.

The method further comprises storing 90, in a dedicated storing structure, such as a table or a database, an association between the mobile network operator identifier and the mobile device subscriber number MSISDN of the called mobile device.

The steps 80 to 90 are repeated for each call-setup, for example for a predetermined period of time of predetermined duration.

Finally, the method comprises, at a later stage, for example after one of several periods of time of predetermined duration, a displaying step 92, for displaying, on a user interface of a user device, an information relative to the association between the identified mobile network operator and the mobile device subscriber number stored during one or several periods of time.

Furthermore, the method may comprise using (step 94) the memorized structure for other operations such as troubleshooting.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

The invention claimed is:

1. A method for determining a mobile network operator identifier in relation to a mobile device subscriber number and to a telecommunications network event, the telecommunications network event comprising a call set-up initiated by a first mobile device having an associated first mobile device subscriber number to connect to a second mobile device having a second mobile device subscriber number, the call set-up comprising sending a request to a portability server, the portability server sending a response formatted according to a predetermined format depending on a type of cellular technology, the method being implemented by at least one processor of a programmable device and comprising steps of:

retrieving said response previously stored in a Call Detail Record (CDR) collected passively during said call set-up;

analyzing said stored response without performing an active query to a number portability database or any other external system during the analyzing step and extracting an identifier of the mobile network operator associated with the second mobile device subscriber number, and storing, in a dedicated storing structure, an association between the mobile network operator identifier and the second mobile device subscriber number of the second mobile device.

2. The method according to claim 1, wherein the analyzing step further comprises passively parsing said stored response to extract said mobile network operator identifier from a redetermined field without initiating a query or request to any network element or external database.

3. The method according to claim 1, further comprising displaying on a user interface, an informative relative to said association for at least one telecommunications network event during a given period of time.

4. The method according to claim 1, wherein the analyzing is followed by extracting a code comprising a Mobile Country Code, MCC, and a Mobile Network Code, MNC, said code being the mobile network operator identifier.

5. The method according to claim 4, further comprising obtaining a mobile network operator name associated to said code from a database, said operator name being the mobile network operator identifier.

6. The method according to claim 5, further comprising displaying the mobile network operator name on a user interface.

7. The method according to claim 4, further comprising, after the extracting said code, determining whether the second mobile device subscriber number is ported or not ported.

8. The method according to claim 4, wherein the cellular technology is 2G or 3G, the portability server is a Mobile Number Portability, MNP, server sending a response formatted according to CoreCS MAP protocol, and
wherein the analyzing step comprises parsing the response from the MNP server to retrieve a portability status of the second mobile device subscriber number, and extracting a first part of a predetermined field of the response, said first part containing five digits representative of the mobile country code and the mobile network code of the operator of the second mobile device.

9. The method according to claim 8, wherein said portability status is indicated by a number stored in a "number Portability Status" field of the response.

10. The method according to claim 9, wherein if the portability status indicates "notKnownToBePorted", the method comprising checking whether said portability status is reliable.

11. The method according to claim 4, wherein the cellular technology is 4G or 5G, the portability server is a Domain Name Server Electronic Numbering server sending a response formatted according to VoIP protocol, and
wherein the method comprises parsing a SIP URI scheme to obtain code digits corresponding to the Mobile Country Code, MCC, and the Mobile Network Code, MNC.

12. The method according to claim 11, further comprising comparing the extracted code digits, forming a first code, to a second code, extracted from a SIP invite request, the second code containing a country code, CC-NDC and a NDC, and if the first code and second code are identical, it is determined that the second mobile device subscriber number is not ported.

13. The method according to claim 1, wherein the analyzing uses control data used for setting-up calls, the response being stored in a data record storing control data.

14. The method according to claim 1, comprising, prior to the analyzing, obtaining the response from control data memorized during call set-up.

15. A non-transitory computer-readable medium with a computer program comprising software instructions which, when implemented by a programmable device, implement steps for determining a mobile network operator identifier, the steps including:
retrieving a response previously stored in a Call Detail Record (CDR) collected passively during call set-up in a telecommunications network where the call-set up is initiated by a first mobile device having an associated first mobile device subscriber number to connect to a second mobile device having a second mobile device subscriber number, the call set-up comprising sending a request to a portability server, the portability server sending a response formatted according to a predetermined format depending on a type of cellular technology;
analyzing said stored response without performing an active query to a number portability database or any other external system during the analyzing step and extracting an identifier of the mobile network operator associated the second mobile device subscriber number, and
storing, in a dedicated storing structure, an association between the mobile network operator identifier and the second mobile device subscriber number of the second mobile device.

16. A system for determining a mobile network operator identifier in relation to a mobile device subscriber number, and to a telecommunications network event, the telecommunications network event comprising a call set-up initiated by a first mobile device having an associated first mobile device subscriber number to connect to a second mobile device having a second mobile device subscriber number, the call set-up comprising sending a request to a portability server, the portability server sending a response formatted according to a predetermined format depending on a type of cellular technology, the system comprising at least one processor configured to implement:
a retrieval module configured to retrieve said previously stored in a Call Detail Record (CDR) collected passively during said call set-up;
an analyzing module configured to analyze said stored response without performing an active query to a number portability database or any other external system during the analyzing step and to extract an identifier of the mobile network operator associated the second mobile device subscriber number, and
a storing module, configured to store, in a dedicated storing structure, an association between the mobile network operator identifier and the second mobile device subscriber number of the second mobile device.

17. The system according to claim 16, comprising a data store configured to memorize said storing structure in the form of a database or a table.

18. The system according to claim 16, wherein the cellular technology is 2G or 3G, the portability server is a Mobile Number Portability, MNP, server sending a response formatted according to CoreCS MAP protocol, and
wherein the analyzing module implements parsing the response from the MNP server to retrieve a portability status of the second mobile device subscriber number, and extracting a first part of a predetermined field of the response, said first part containing five digits representative of the mobile country code and the mobile network code of the operator of the second mobile device.

19. The system according to claim 16, wherein the cellular technology is 4G or 5G, the portability server is a Domain Name Server Electronic Numbering server sending a response formatted according to VoIP protocol, and wherein the analyzing module further implements parsing a SIP URI scheme to obtain code digits corresponding to the Mobile Country Code, MCC, and the Mobile Network Code, MNC.

20. The system according to claim 16, wherein the mobile network operator identifier is a code comprising a Mobile Country Code, MCC, and a Mobile Network Code, MNC, the system being configured for obtaining a mobile network operator name associated to said code from a database, and for displaying the mobile network operator name on a user interface.

\* \* \* \* \*